H. GREFFENIUS.
SHIP FOR TRANSPORTING RAW PRODUCTS.
APPLICATION FILED JUNE 6, 1919.

1,422,354.  Patented July 11, 1922.

Witnesses:

Inventor:

UNITED STATES PATENT OFFICE.

HUGO GREFFENIUS, OF FRANKFORT ON THE MAIN, GERMANY.

SHIP FOR TRANSPORTING RAW PRODUCTS.

1,422,354.      Specification of Letters Patent.      Patented July 11, 1922.

Application filed June 6, 1919. Serial No. 302,369.

*To all whom it may concern:*

Be it known that I, HUGO GREFFENIUS, a citizen of Germany, residing at Frankfort on the Main, in the State of Prussia, Germany, have invented certain new and useful Improvements in Ships for Transporting Raw Products, of which the following is a specification.

My present invention relates to a ship for transporting raw materials, particularly corn. The invention also applies to ships used for carrying oil seeds, nuts, copra, wool, cotton, leather, and other raw products.

Certain countries, especially, Germany, are obliged to obtain the raw products from other parts of the earth, mostly over the sea. Germany, particularly, is obliged, to import, in addition to other kinds of cereals and grains, for example, maize and rye, about 50% of imported wheat to be mixed with the home wheat, which has not very good baking properties, being too moist and having but a small percentage of gluten. It must therefore be mixed with dry imported corn having a high percentage of gluten. The corn imported is transported about as follows:

The corn is loaded out of large transoceanic silos or from barges into the holds of large ocean steamers by which it is taken to the distant seaport, where the ships are unloaded. In this case the unloading is effected with the assistance of barges, which receive the corn from the ocean steamers by suitable apparatus, in order to be taken to the large silos and storage houses in the ports, where it is again unloaded, weighed and brought into storage houses for a longer or shorter time. Afterwards the corn is usually taken inland by ships, to inland towns and cities. Even there the corn is not ground at once, but changes hands more or less, before it is brought to a mill. In large mills the corn is ground and a large part of the finished products, the flour and the bran, is exported, being taken back by water to the seaports.

A large part is taken to these harbours by train, where it is loaded into barges and from thence into ocean steamers in order to be taken abroad frequently, back to the place it came from. These operations take considerable time, which cannot be utilized at present for manufacturing purposes.

A number of manipulations are thus carried out which represent a waste of materials and labour, which is in consequence, a reduction in production. The coefficient of labour, that is the quotient of the effective work and the actual work done, is very unsatisfactory.

Owing to the long time required for the transport, particularly when the conditions are not favourable, losses occur which cannot be recovered again. It often occurs that in the large transport ships, in which 5000 to 6000 tons of corn, or even more, are loaded, the corn becomes warm and bakes together, so that it can only be pulled apart with the assistance of suitable implements, when unloading the same, quite apart from the enormous injury done to the material by this change.

In addition to that, the home canals and railways, according to the method of transporting and treating the corn at present adopted, are subjected to double strain. This applies also to the storage houses and transporting means at the places where the corn is loaded and unloaded.

Now, the present invention consists in providing for the conversion of the raw material into finished and half finished products during the transportation of the grain or other deteriorative material. This is accomplished by providing the ship with a suitable manufacturing plant. For example a transport ship used for corn is provided with a mill which converts the corn into intermediate or end products, such as flour and bran, in accordance with the particular conditions given. Continuing the example chosen, steamers of 6000 tons carrying corn from Argentine to Europe required normally 40 to 50 days and can be provided with a milling plant of about 450 H. P., which required a room of about 4500 cbm. This represents a comparatively small enlargement of the ship's hold.

As, owing to the treatment of the raw material during the transport over the sea, considerable time heretofore required for transport is saved, it is of no moment when the ship does not keep up the normal speed of 12 to 14 knots per hour for example, and it can make 1 or 2 knots less. It has been ascertained that the coal required for increasing the speed to one knot extra is very much larger in proportion to that required without the increased speed, so that by reducing the usual speed of the ships more coal is saved than is required to supply the above mentioned power of 450 H. P. Moreover the machine plant is not worked at a maximum during the transport, so that the 450 H. P. are yielded by the machine plant without difficulty. As a consequence less coal can be taken by the ships for the same power and this coal will effect both the transport of the corn and simultaneously the manufacture of flour, etc. during nearly all the time.

In addition to this gain the gain obtained by avoiding the transport from the sea ports to inland harbours and for carrying a part of the products back over the same way must be reckoned. The export can therefore be increased quite considerably without it being necessary to build new stationary plants in the country which is to receive part of the flour manufactured en route and return or reship the remaining part to other countries.

In the accompanying drawing, which shows by way of example and diagrammatically a ship according to this invention, Figure 1 is a longitudinal section of a ship showing the relative arrangement of the various parts of the plant.

Figure 1:
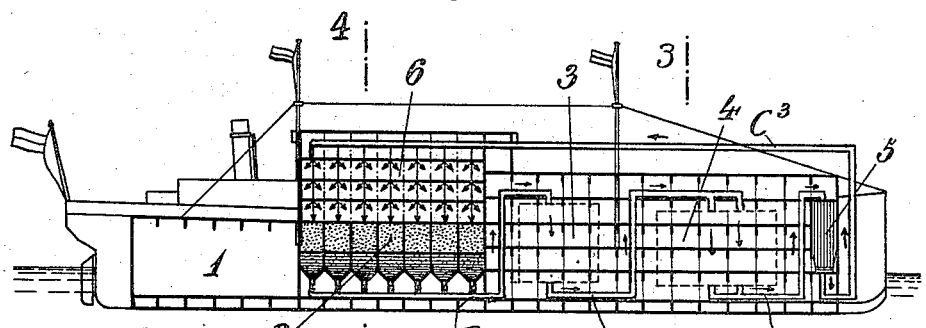
Figure 2:
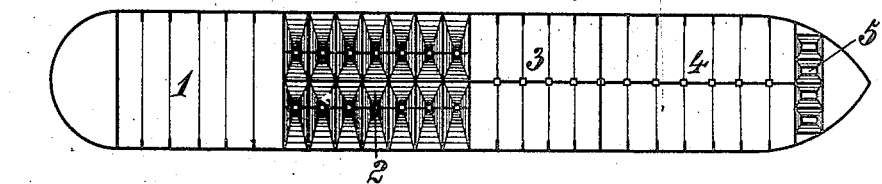
Fig. 2 is a plan view of a ship showing particularly the storage bins for the grain and flour.
Figure 3:
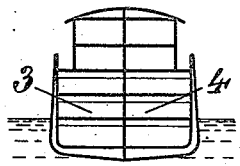
Fig. 3 is a transverse section taken on the line 3—3 of Fig. 1.
Figure 4:
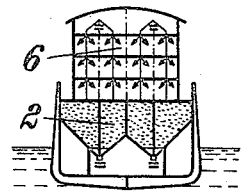
Fig. 4 is also a transverse section but is taken on the line 4—4 of Fig. 1.

The ship illustrated has engine and boiler rooms in the space 1 adjacent the stern, and forwardly of the space 1 is provided with storage bins 2 for the raw grain as it is received by the ship. Connected with the storage bins 2 by a conveyor C and located forwardly of the bins is machinery 3 for cleaning and otherwise preparing the grain for the milling operation. The prepared grain is carried by a conveyor C' from the cleaning machinery 3 to the mill 4 and after having been ground passes through a conveyor C² to a mixer 5. Then the mixed flour is carried by a conveyor C³ to storage bins 6 in which the flour is carried to port.

A ship, owing to its construction, is particularly adapted for the construction of a mill in several stories. The advantages obtained by the combination of a transport ship with means for manufacturing or treating the materials, particularly with a milling plant, are apparent. As soon as the corn is loaded the work can be commenced in the milling plant. The conveying devices provided in every mill for conveying the corn and the finished products can be used economically in order to shift the corn and thus to ventilate it, so that the drawbacks arising owing to the corn becoming warm and baking together are avoided without difficulty. If it was desired to employ such a method with the transport ships heretofore used a certain space would have to have been left free and transporting means for shifting the corn would have to have been provided in the ship.

A special advantage consists in the fact that the finished products which were received by the ship as raw material are conducted directly to the place of destination, that is to the ports at which the steamer stops, without it being necessary for the corn to be unloaded and loaded again, stored and then transported back to the first place, as heretofore done in certain countries as for example, Germany. Owing to this economy of time a great saving of expense is effected. The transport ships can be much better utilized and the home transporting facilities do not need to be worked under such a strain as at present necessary.

The price for making the half finished and finished products can be kept much lower, and the export is thus considerably facilitated, so that foreign competition can be readily met. A better prospect is also afforded for the sale in free trading ports.

The same advantages also apply to ships used for transporting other raw materals, which are subjected to manufacturing processes in the country to which they are destined and are then exported more or less, provided of course that the manufacturing plant can be arranged in the ship. This relates especially to goods which easily spoil or deteriorate in quality during the journey.

Instead of the milling plant other manufacturing plants can be provided in order to be able to treat the materials in question and to convert them into the finished or half finished products.

In a similar manner ships or similar plants adapted only for short distances on sea or canal ports can be provided with plants for treating said materials, for the purpose of cheapening the production and of relieving the stationary plants. Such ships could receive the raw materials from ocean steamers, carry out the desired manufacturing process without requiring the stationary plant and return the half finished and finished products to the ocean steamers again.

What I claim and desire to secure by Letters Patent of the United States is:—

1. A ship adapted for the transportation of grain and the like having thereon facilities for storing the grain, a mill for grinding the grain during the transportation thereof, means for conveying the grain to the mill from the storage place, and means for storing the main and by-products resulting from the milling of the grain.

2. A ship adapted for the transportation of grain and the like having thereon facilities for storing the grain, and a mill for grinding the grain during the transportation thereof.

3. A ship adapted for the transportation of grain and the like having thereon facilities for storing the grain, a mill for grinding the grain, and means for conveying the grain to the mill.

In testimony whereof I have affixed my signature in presence of two witnesses.

HUGO GREFFENIUS.

Witnesses:
 Dr. Oskar Koppel,
 A. Schön.